United States Patent
Hsu et al.

(10) Patent No.: US 8,025,411 B2
(45) Date of Patent: Sep. 27, 2011

(54) LIQUID CRYSTAL PANEL AND PROJECTOR USING THE SAME

(75) Inventors: Chien-Wen Hsu, Tapiei Hsien (TW);
Po-Lin Wang, Taipei Hsien (TW);
Ching-Te Chu, Taipei Hsien (TW);
Yu-Shan Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 821 days.

(21) Appl. No.: 12/110,547

(22) Filed: Apr. 28, 2008

(65) Prior Publication Data
US 2009/0073329 A1  Mar. 19, 2009

(30) Foreign Application Priority Data
Sep. 18, 2007  (CN) .......................... 2007 1 0201757

(51) Int. Cl.
*G03B 3/00* (2006.01)
*G03B 21/14* (2006.01)
*G02F 1/1335* (2006.01)
(52) U.S. Cl. ............................. 353/38; 353/101; 349/95
(58) Field of Classification Search .............. 353/30–31, 353/38, 101; 349/61–62, 95; 359/665–666
See application file for complete search history.

(56) References Cited

U.S. PATENT DOCUMENTS

| | | | | |
|---|---|---|---|---|
| 5,101,279 A * | 3/1992 | Kurematsu et al. | ............. | 349/95 |
| 5,231,432 A * | 7/1993 | Glenn | .............. | 353/31 |
| 5,758,940 A * | 6/1998 | Ogino et al. | ............... | 353/38 |
| 7,079,203 B1 * | 7/2006 | Huang et al. | .............. | 349/95 |
| 7,250,923 B2 * | 7/2007 | Taira et al. | ............... | 345/6 |
| 2007/0008617 A1 * | 1/2007 | Shestak et al. | .............. | 359/455 |

OTHER PUBLICATIONS

B.Berge and J. Peseux, "Variable focal lens controlled by an external voltage: An application of electrowetting", Spring-Summer 2000 (Dec. 1, 1999), The European Physical Journal E, EDP Sciences, Ed. 3, pp. 159-163.*

* cited by examiner

Primary Examiner — Georgia Y Epps
Assistant Examiner — Jori S Reilly-Diakun
(74) Attorney, Agent, or Firm — Altis Law Group, Inc.

(57) ABSTRACT

A liquid crystal panel includes a liquid crystal display element, a micro-lens array, an adjustable lens array, and a lens control unit electrically connected to the adjustable lens array. The liquid crystal display element has a light input surface and a light output surface opposite to the light input surface. The micro-lens array has a plurality of micro-lenses disposed on the light input surface of the liquid crystal display element). The adjustable lens array has a plurality of adjustable lenses disposed on the light output surface of the liquid crystal display element. The lens control unit is capable of controlling focal lengths of the plurality of adjustable lenses.

14 Claims, 4 Drawing Sheets

LIQUID CRYSTAL PANEL AND PROJECTOR USING THE SAME

BACKGROUND

1. Technical Field

The present invention generally relates to a liquid crystal panel and a projector using the same, and more particularly to a liquid crystal panel with an adjustable lens array and a projector using the same.

2. Description of Related Art

Projectors are generally divided into transmission and reflective categories. During operation of a transmission-type projector, light emitted from a light source is separated into three color lights which are red (R), green (G) and blue (B) by a color separation optical system, and then the color lights R, G and B enter three liquid crystal panels in a one-to-one manner. The three liquid crystal panels modulate the color lights R, G and B respectively according to given image information. The modulated color lights R, G and B are combined by a cross dichroic prism and then are projected through a projection lens onto a screen to form a visible colored image.

The liquid crystal panel of the transmission-type projector generally comprises a thin film transistor (TFT) array, and a light transitive liquid crystal molecule layer which is controlled by the thin film array. Since the thin film transistor array is usually made of non-crystal material which is sensitive to photoemission, a black matrix is usually adopted in the liquid crystal panel to prevent light from directly irradiating on the thin film transistor array and to prevent contrast ratio reduction due to light leakage from a non-display area between pixels of the liquid crystal panel.

However, the presence of the black matrix results in the loss of incidence of light on the liquid crystal panel, and this leads to depravation of an aperture ratio and reduction of brightness of the liquid crystal panel. The aperture ratio means the ratio of an area through which the light passes to a total area of the liquid crystal panel. The higher the aperture ratio, the more the light passing through the liquid crystal panel. When the aperture ratio decreases, the screen becomes darker, resulting in lowered image quality.

In order to improve the aperture ratio of the liquid crystal panel, a micro-lens array (MLA) may be adopted to cooperative with the black matrix. Light which is blocked by the black matrix, is effectively converged onto the aperture of the pixels by the micro-lens array so as to improve the aperture ratio of the liquid crystal panel.

However, light modified by the micro-lens array enters the liquid crystal panel varying with a large angular difference, and this results in that the light to be emitted from the liquid crystal panel also has a large angular difference. As a result, the light emitted from the liquid crystal panel enters the projection lens with a large angular difference. There is a high possibility that light emitted from the liquid crystal panel with a large emission angle (this means a large incident angle to the projection lens), can not enter the pupil of the projection lens. This might cause problems like chrominance nonuniformities of the projected image, lowered contrast and reduced brightness of the projected image.

SUMMARY

The present invention provides a liquid crystal panel. The liquid crystal panel includes a liquid crystal display element having a light input surface and a light output surface opposite to the light input surface; a micro-lens array having a plurality of micro-lenses disposed on the light input surface of the liquid crystal display element; an adjustable lens array having a plurality of adjustable lenses disposed on the light output surface of the liquid crystal display element; and a lens control unit electrically connected to the adjustable lenses for controlling focal lengths of the adjustable lenses.

The present invention provides a projector. The projector includes a light source unit for emitting light; a projection lens for projecting images on a screen; and a liquid crystal panel having a liquid crystal display element with a light input surface and a light output surface, a micro-lens array disposed on the light input surface, an adjustable lens array disposed on the light output surface, and a lens control unit electrically connected to the adjustable lenses for controlling focal length of the adjustable lens array. The liquid crystal display element, the micro-lens array and the adjustable lens array are so arranged that the light from the light source unit is first converged onto the light input surface of the liquid crystal display element by the micro-lens array, and the light entering the liquid crystal display element is modulated by the liquid crystal display element according to given image data before emitted from the light output surface; then the light emitted from the light output surface is modulated by the adjustable lenses array via the focal length of the adjustable lenses array controlled by lens control unit so that the light emits from the adjustable lens array with an adjustable angular difference before entering the projection lens.

The present invention provides a liquid crystal panel. The liquid crystal panel includes a liquid crystal display element; a micro-lens array having a plurality of micro-lenses; and an adjustable lens array having a plurality of adjustable lenses. Each of the plurality of adjustable lenses has a tunable focal length. The plurality of adjustable lenses cooperates with the plurality of micro-lenses in such a manner that light passing through the liquid crystal display element is modulated by the plurality of adjustable lenses and the plurality of micro-lenses so that the light emits from the liquid crystal panel with an adjustable angular difference.

Other advantages and novel features of the present invention will become more apparent from the following detailed description of preferred embodiments when taken in conjunction with the accompanying drawings.

DETAILED DESCRIPTION

Figure 1:
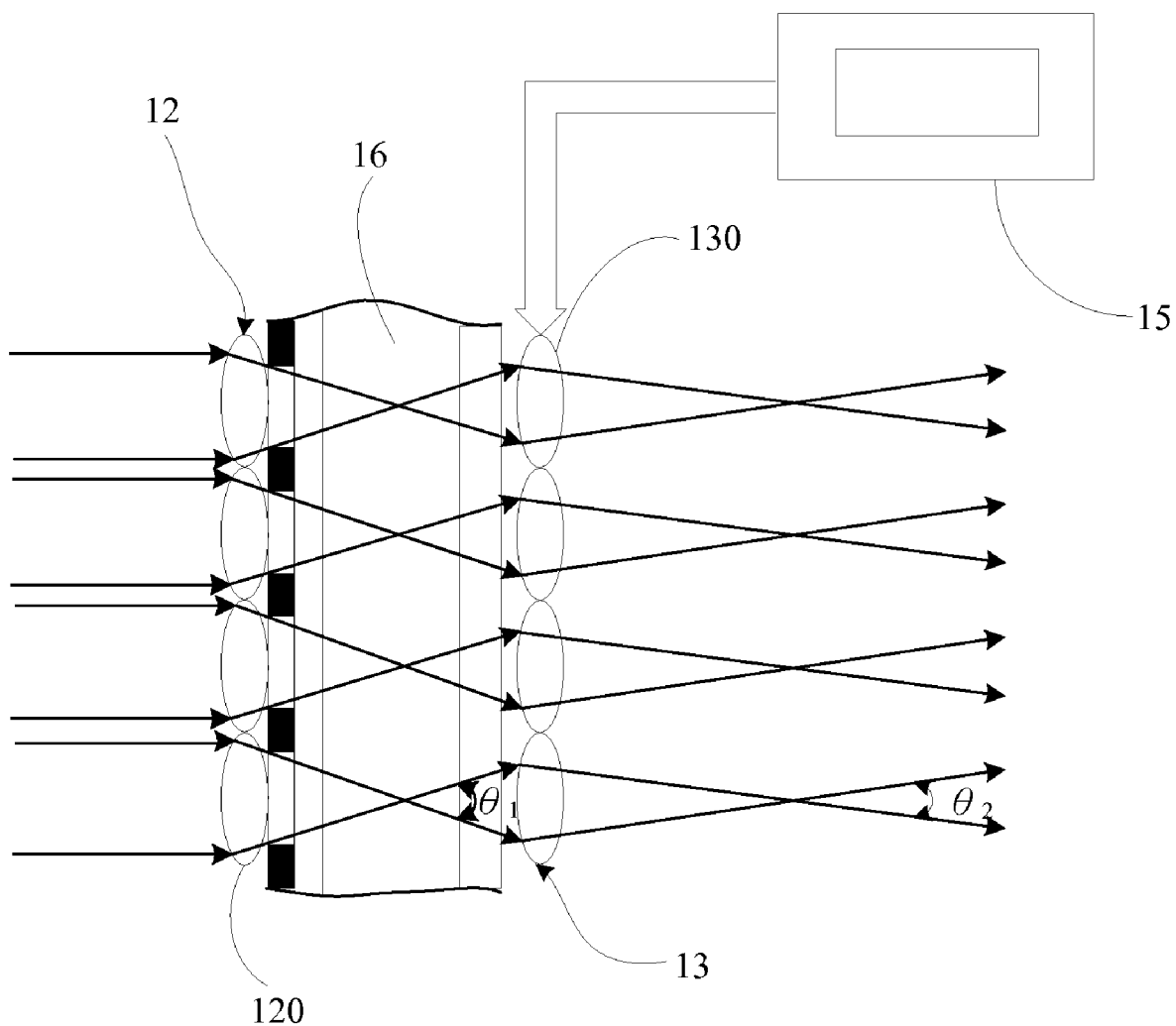
FIG. 1 is an explanatory view of a liquid crystal panel in accordance with an embodiment of the present invention.

Reference will now be made to the drawing figures to describe the preferred embodiment in detail.

Referring to FIG. 1, the liquid crystal panel 310 comprises a micro-lens array 12, a liquid crystal display element 16, an adjustable lens array 13, and a lens control unit 15. The liquid crystal display element 16 has a light input surface, and a light output surface opposite to the light input surface. The micro-lens array 12, the liquid crystal display element 16, and the adjustable lens array 13 are arranged in a same light path, so that the light passes in order.

The micro-lens array 12 comprises a plurality of micro-lenses 120 positioned on the light input surface of the liquid crystal display element 16. The micro-lenses 120 cover pixels of the liquid crystal display element 16 in a one-to-one manner.

The adjustable lens array 13 comprises a plurality of adjustable lenses 130 positioned on the light output surface of the liquid crystal display element 16. The adjustable lenses 130 may be liquid lenses or liquid crystal lenses each having a tunable focal length. The adjustable lenses 130 are located corresponding to the micro-lenses 120 in a one-to-one manner. The adjustable lenses 130 are electrically connected to and controlled by the lens control unit 15. The focal length of each of the adjustable lenses 130 can be adjusted by an output voltage generated from the lens control unit 15.

In operation of the liquid crystal panel 310, external light reaches to the micro-lens array 12 and then is converged onto the apertures of the pixels of the liquid crystal display element 16 by the micro-lens array 12. The light modified by the micro-lens array 12 emits out of the light output surface of the liquid crystal display element 16 with a large angular difference, which is identified as □$_1$ shown in FIG. 1.

Then, the light emitted from the liquid crystal display element 16 is modified by the adjustable lens array 13 via adjusting the focal length of each of the adjustable lenses 130, and is then emitted out of the adjustable lens array 13 with an angular difference, which is identified as □$_2$ shown in FIG. 1. The □$_2$ is smaller than the □$_1$. Therefore, by the presence of the adjustable lens array 13, the light emitted from the liquid crystal panel 310 has an adjustable angular difference so as to achieve a higher resolution of projected images.

Figure 2:
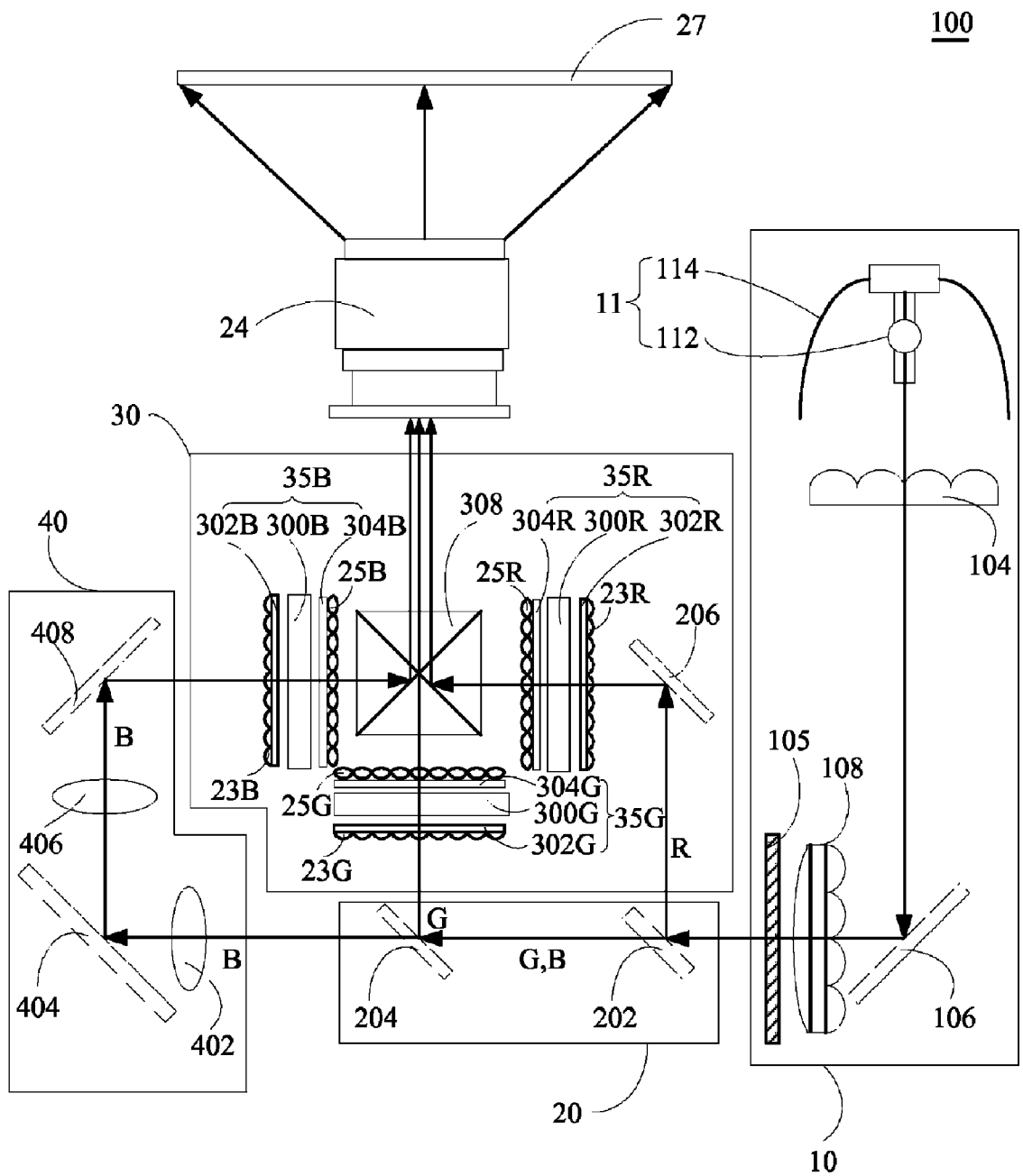
FIG. 2 is an explanatory view of a projector to which the liquid crystal panel of FIG. 1 can be applied of the present invention.

FIG. 2 is an explanatory view of a projector 100 to which the liquid crystal panel 310 of FIG. 1 can be applied of the present invention. The projector 100 comprises a light source unit 10, a color light separation optical system 20, a light modulating system 30, a relay optical system 40 and a projection lens 24.

The light source unit 10 comprises a light source 11, lens arrays 104, 108, a reflection mirror 106, and a polarization conversion element 105. The color light separation optical system 20 comprises a first dichroic mirror 202, a second dichroic mirror 204, and a reflection mirror 206. The light modulating system 30 comprises a first liquid crystal panel 35R, a second liquid crystal panel 35G, a third liquid crystal panel 35B, and a cross dichroic prism 308. The relay optical system 40 comprises two reflection mirrors 404, 408, a first relay lens 402, and a second relay lens 406.

The light source 11 includes a lamp 112 with high luminance, such as a high pressure halogen lamp or a high pressure mercury lamp, and a concave mirror 114. The concave mirror 114 has a paraboloid of revolution to emit light emerged from the lamp 112 as light beams nearly parallel to each other.

The light emitted from the light source unit 10 is separated into the three color rights of red (R), green (G) and blue (B) by the color light separation optical system 20. The first dichroic mirror 202 reflects R light and directly transmits B light and G light to the second dichroic mirror 204. The second dichroic mirror 204 reflects G light and directly transmits B light to the relay optical system 40. The R light reflected by the first dichroic mirror 202 is incident to the first liquid crystal panel 35R through the reflection mirror 206. The G light passing through the first dichroic mirror 202 and reflected by the second dichroic mirror 204, is incident to the second liquid crystal panel 35G. The relay optical system 40 leads the B light, which has a long optical path, to the third liquid crystal panel 35B. The liquid crystal panels 35R, 35G and 35B modulate each of the color lights according to given image data and serve as optical modulators. The cross dichroic prism 308 combines each of the modulated color light from the liquid crystal panels 35R, 35G and 35B. The projection lens 24 expands and projects the combined color lights on a screen 27 to form a visible colored image.

Each of the liquid crystal panels 35R, 35G and 35B has a structure similar to that of the liquid crystal panel 310, which is shown in FIG. 1. The detailed structures of the liquid crystal panels 35R, 35G and 35B will be described in the following text.

The first liquid crystal panel 35R comprises a liquid crystal display element 300R, a micro-lens array 302R and an adjustable lens array 304R. The liquid crystal display element 300R has a light input surface and a light output surface opposite to the light input surface. The micro-lens array 302R comprises a plurality of micro-lens 23R disposed on the light input surface of the liquid crystal display element 300R. The adjustable lens array 304R comprises a plurality of adjustable lenses 25R disposed on the light output surface of the liquid crystal display element 300R. The micro-lenses 23R is configured for enabling the incident light of the first liquid crystal panel 35R to enter the respective pixels of the liquid crystal display element 300R. The adjustable lenses 25R is configured for adjusting the emission angle of the light emitted from the first liquid crystal panel 35R.

The second liquid crystal panel 35G comprises a liquid crystal display element 300G, a micro-lens array 302G, and an adjustable lens array 304G. The liquid crystal display element 300G has a light input surface, and a light output surface opposite to the light input surface. The micro-lens array 302G comprises a plurality of micro-lens 23G disposed on the light input surface of the liquid crystal display element 300G. The adjustable lens array 304G comprises a plurality of adjustable lenses 25G disposed on the light output surface of the liquid crystal display element 300G. The micro-lenses 23G is configured for enabling the incident light of the second liquid crystal panel 35G to enter the respective pixels of the liquid crystal display element 300G. The adjustable lenses 25G is configured for adjusting the emission angle of the light emitted from the second liquid crystal panel 35G.

The third liquid crystal panel 35B comprises a liquid crystal display element 300B, a micro-lens array 302B and an adjustable lens array 304B. The liquid crystal display element 300B has a light input surface, and a light output surface opposite to the light input surface. The micro-lens array 302B comprises a plurality of micro-lenses 23B disposed on the light input surface of the liquid crystal display element 300B. The adjustable lens array 304B comprises a plurality of adjustable lenses 25B disposed on the light output surface of the liquid crystal display element 300B. The micro-lenses 23B is configured for enabling the incident light of the third liquid crystal panel 35B to enter the respective pixels of the liquid crystal display element 300B. The adjustable lenses 25B is configured for adjusting the emission angle of the light emitted from the third liquid crystal panel 35B.

As described above, the micro-lenses 23R, 23G and 23B have same functions as that of the micro-lenses 120 shown in FIG. 1. The adjustable lenses 25R, 25G and 25B have same functions as that of the adjustable lenses 130 shown in FIG. 1. By the presence of the micro-lenses 23R, 23G, 23B and the adjustable lenses 25R, 25G, 25B, the light emitted from each of the liquid crystal panels 35R, 35G and 35B has an adjustable angular difference. Thus, almost all of the light emitted from each of the liquid crystal panels 35R, 35G, 35B can enter the pupil of the projection lens 24. As a result, projected images with high resolution can be formed on the screen 27. When the projected images have low resolution, focal lengths of the adjustable lenses 25R, 25G, 25B are varied according to the varied degree of voltage applied to the adjustable lenses 25R, 25G, 25B until the projected images reaches high resolution.

Figure 3:
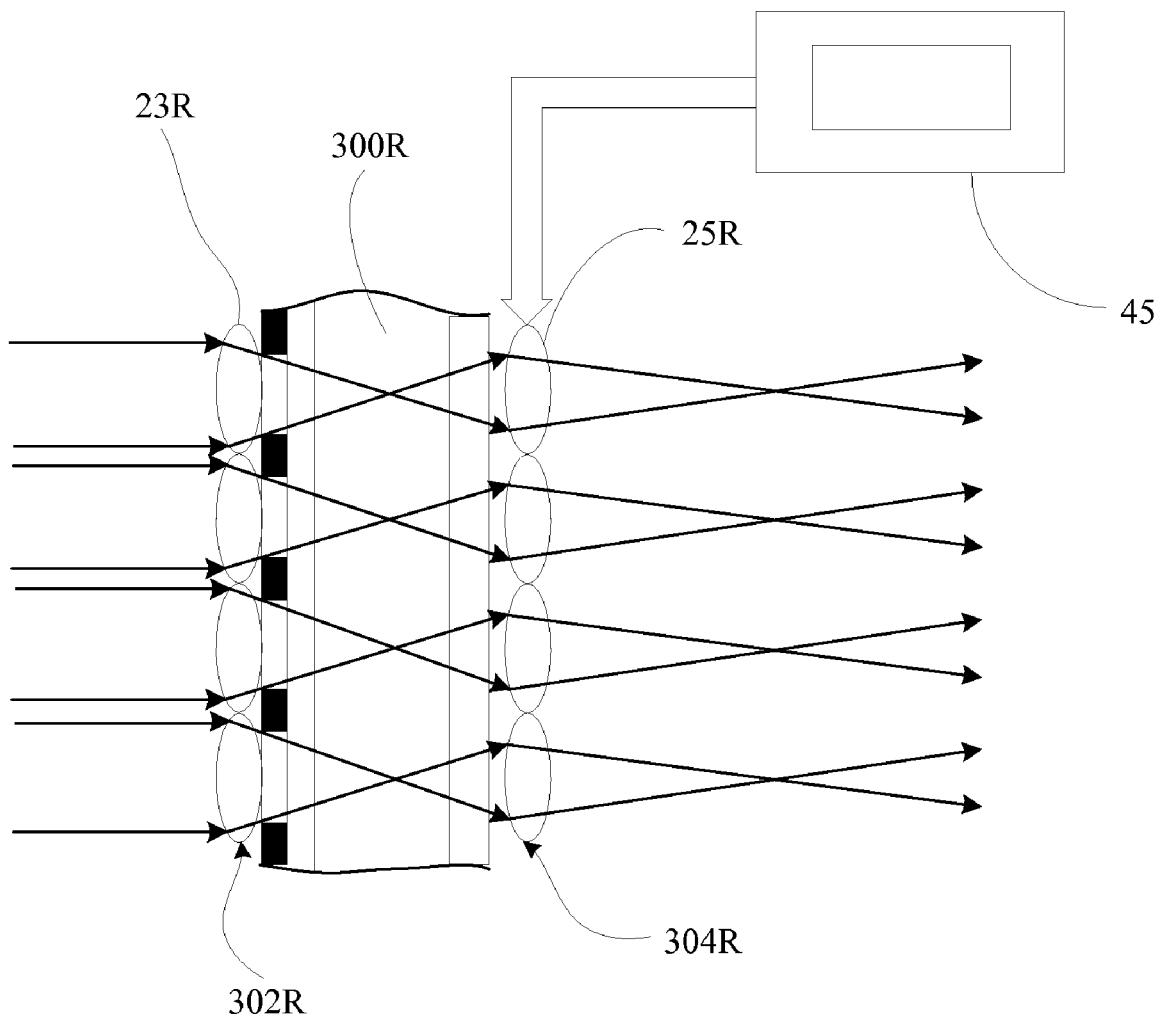
FIG. 3 is an explanatory view of a first liquid crystal panel of FIG. 2 together with a lens control unit of the present invention.
Figure 4:
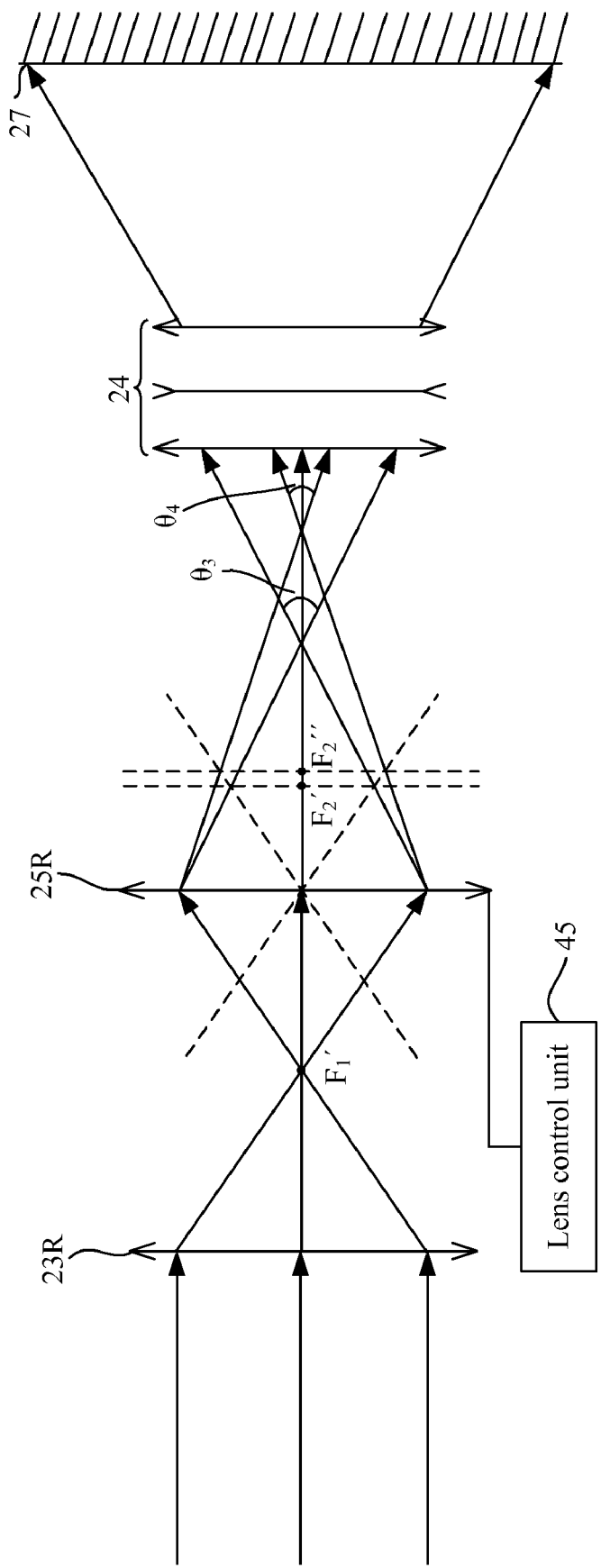
FIG. 4 is an explanatory view showing a model of the function of an adjustable lens array of FIG. 2 of the present invention.

As shown in FIG. 3 and FIG. 4, the first liquid crystal panel 35R is taken as an example to explain the working principle of the micro-lenses 23R cooperating with the adjustable lenses 25R to improve the quality of the projected images. Suppose that when the projected images have low resolution, the image focal length of each of the micro-lenses 23R is F1' correspondingly, and the image focal length of each of the adjustable lenses 25R is F2' correspondingly. At this stage, external light modulated by the micro-lenses 23R and the adjustable lenses 25R enters the projection lens 24 with an angular difference, which is identified as □₃.

At the next stage, the lens control unit 45 adjusts the voltage applied to the adjustable lens 25R. As a result, the image focal length of the adjustable lens 25R is adjusted corresponding to the variations of the voltage controlled by the lens control unit 45. When the voltage applied to the adjustable lens 25R is gradually reduced, the focal length of the adjustable lens 25R is gradually increased. When the focal length of the adjustable lens 25R reaches to a desired value, which is identified as F2" and larger than the F2' in this preferred embodiment, the light modulated by the micro-lenses 23R and the adjustable lenses 25R enters the projection lens 24 with an angular difference, which is identified as □₄. The □₄ is smaller than □₃. Thus, the light emitted from the first liquid crystal panel 35R has a smaller angular difference □₄ than □₃ and can enter the pupil of the projection lens 24 because the light is converged later so as to improve the quality of the projected image.

Although only the projector 100 using the three liquid crystal panels 35R, 35G, 35B is shown in the aforementioned exemplary embodiments, the present invention may be applied to a projector using only one liquid crystal panel, a projector using two liquid crystal panels, a projector using four or more liquid crystal panels, and so on.

Although only the projector 100 using the three liquid crystal panels 35R, 35G, 35B each including an adjustable lens array 304R, 304G, 304B is shown in the aforementioned exemplary embodiments, the present invention may be applied to a projector using only one liquid crystal panel including an adjustable lens array, a projector using two liquid crystal panels each including an adjustable lens array, or a projector using four or more liquid crystal panels each including an adjustable lens array.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal panel comprising:
    a liquid crystal display element comprising a light input surface and a light output surface opposite to the light input surface;
    a micro-lens array comprising a plurality of micro-lenses disposed on the light input surface of the liquid crystal display element;
    an adjustable lens array comprising a plurality of adjustable lenses disposed on the light output surface of the liquid crystal display element; and
    a lens control unit electrically connected to the adjustable lenses for controlling focal lengths of the adjustable lenses.

2. The liquid crystal panel of claim 1, wherein the plurality of micro-lenses covers pixels of the liquid crystal display element in a one-to-one manner.

3. The liquid crystal panel of claim 2, wherein the plurality of adjustable lenses is located corresponding to the plurality of micro-lenses in a one-to-one manner.

4. The liquid crystal panel of claim 3, wherein the adjustable lenses are liquid lenses.

5. The liquid crystal panel of claim 3, wherein each of the adjustable lenses is liquid crystal lens with a tunable focal length.

6. The liquid crystal panel of claim 1, wherein the lens control unit controls degree of voltage applied to the adjustable lenses so as to adjust the focal lengths of the adjustable lenses.

7. A projector comprising:
    a light source unit for emitting light;
    a projection lens for projecting images on a screen; and
    a liquid crystal panel comprising:
        a liquid crystal display element with a light input surface and a light output surface;
        a micro-lens array disposed on the light input surface;
        an adjustable lens array disposed on the light output surface; and
        a lens control unit electrically connected to the adjustable lenses for controlling focal length of the adjustable lens array;
    wherein the liquid crystal display element, the micro-lens array and the adjustable lens array are so arranged that the light from the light source unit is first converged onto the light input surface of the liquid crystal display element by the micro-lens array, and the light entering the liquid crystal display element is modulated by the liquid crystal display element according to given image data before emitted from the light output surface; then the light emitted from the light output surface is modulated by the adjustable lenses array via the focal length of the adjustable lenses array controlled by lens control unit so that the light emits from the adjustable lens array with an adjustable angular difference before entering the projection lens.

8. The projector of claim 7, wherein the adjustable lens array comprises a plurality of liquid lenses disposed on the light output surface of the liquid crystal display element.

9. The projector of claim 8, wherein the lens control unit controls degree of voltage applied to the liquid lenses so as to adjust the focal lengths of the liquid lenses.

10. The projector of claim 8, wherein the micro-lens array comprises a plurality of micro-lenses disposed on the light input surface, and the plurality of liquid lenses is located corresponding to the plurality of micro-lenses in a one-to-one manner.

11. A liquid crystal panel comprising:
    a liquid crystal display element;
    a micro-lens array comprising a plurality of micro-lenses; and
    an adjustable lens array comprising a plurality of adjustable lenses, each of the plurality of adjustable lenses comprising a tunable focal length;
    wherein the plurality of adjustable lenses cooperates with the plurality of micro-lenses in such a manner that light passing through the liquid crystal display element is modulated by the plurality of adjustable lenses and the plurality of micro-lenses so that the light emits from the liquid crystal panel with an adjustable angular difference.

12. The liquid crystal panel of claim 11, wherein the plurality of adjustable lenses cooperates with the plurality of micro-lenses in a one-to-one manner.

13. The liquid crystal panel of claim 11, wherein the liquid crystal display element comprises a light input surface and a light output surface opposite to the light input surface, and the adjustable lenses are disposed on the light output surface of the liquid crystal display element and the micro-lenses are disposed on the light input surface of the liquid crystal display element.

14. The liquid crystal panel of claim 11, further comprising a lens control unit electrically connected to the plurality of adjustable lenses for controlling focal lengths of the plurality of adjustable lenses.

* * * * *